(12) United States Patent
Rofougaran

(10) Patent No.: US 8,155,604 B2
(45) Date of Patent: *Apr. 10, 2012

(54) METHOD AND SYSTEM FOR POWER SUPPLY ADJUSTMENT AND POLAR MODULATION IN AN RF TRANSMITTER

(75) Inventor: Ahmadreza Rofougaran, Newport Coast, CA (US)

(73) Assignee: Broadcom Corporation, Irvine, CA (US)

( * ) Notice: Subject to any disclaimer, the term of this patent is extended or adjusted under 35 U.S.C. 154(b) by 586 days.

This patent is subject to a terminal disclaimer.

(21) Appl. No.: 11/864,861

(22) Filed: Sep. 28, 2007

(65) Prior Publication Data

US 2009/0036072 A1 Feb. 5, 2009

Related U.S. Application Data

(60) Provisional application No. 60/953,095, filed on Jul. 31, 2007.

(51) Int. Cl.
*H04B 1/66* (2006.01)
*H04B 1/04* (2006.01)

(52) U.S. Cl. ..... 455/102; 455/108; 455/110; 455/127.1; 330/149

(58) Field of Classification Search .......... 455/102, 455/108, 110, 127.1, 127.2; 330/10, 149
See application file for complete search history.

(56) References Cited

U.S. PATENT DOCUMENTS

| | | | |
|---|---|---|---|
| 5,420,536 A * | 5/1995 | Faulkner et al. | 330/149 |
| 6,078,628 A * | 6/2000 | Griffith et al. | 375/300 |
| 6,438,360 B1 * | 8/2002 | Alberth et al. | 455/110 |
| 6,714,071 B1 * | 3/2004 | Page | 330/136 |
| 6,900,693 B2 | 5/2005 | Sasho et al. | |
| 6,996,191 B1 | 2/2006 | Meditz | |
| 7,026,868 B2 * | 4/2006 | Robinson et al. | 330/10 |
| 7,092,683 B2 * | 8/2006 | Tanaka et al. | 455/108 |
| 7,139,534 B2 * | 11/2006 | Tanabe et al. | 455/108 |
| 7,424,064 B2 * | 9/2008 | Shakeshaft et al. | 375/295 |
| 7,457,598 B2 | 11/2008 | Zahm et al. | |
| 7,519,336 B2 | 4/2009 | Vepsalainen et al. | |
| 7,579,922 B2 * | 8/2009 | Jensen et al. | 332/128 |
| 7,593,698 B1 * | 9/2009 | Johnson et al. | 455/102 |
| 7,696,821 B2 | 4/2010 | Rofougaran | |
| 2002/0197975 A1 * | 12/2002 | Chen | 455/324 |

(Continued)

OTHER PUBLICATIONS

Frequency mixer, Wikipedia article, retrieved Aug. 29, 2011 from Internet.*

(Continued)

*Primary Examiner* — Duc M Nguyen
(74) *Attorney, Agent, or Firm* — Farjami & Farjami LLP

(57) ABSTRACT

Aspects of a method and system for power supply adjustment for polar modulation of an RF signal are provided. In an RF transmitter, a signal representative of an amplitude of a pair of phase-quadrature baseband signals may be generated, and a voltage and/or current supplied to one or more components of said RF transmitter may be controlled based on said generated signal. Additionally, aspects of the invention may enable dividing each signal of said pair of baseband signals by said generated signal, up-converting the divided signals, and combining the up-converted signals to generate a phase modulated RF signal. The one or more components may comprise, for example, one or more amplifiers, and/or one or more mixers. The generated signal may result from squaring each signal of the pair of baseband signals and calculating a square root of a sum of the squared signals.

18 Claims, 5 Drawing Sheets

U.S. PATENT DOCUMENTS

| | | | |
|---|---|---|---|
| 2003/0045243 | A1 | 3/2003 | Rahuhala |
| 2005/0100105 | A1 | 5/2005 | Jensen |
| 2005/0159177 | A1* | 7/2005 | Trachewsky et al. ......... 455/522 |
| 2005/0191976 | A1* | 9/2005 | Shakeshaft et al. ........... 455/118 |
| 2005/0195918 | A1 | 9/2005 | Matsuura et al. |
| 2006/0227895 | A1 | 10/2006 | Booth et al. |
| 2008/0225984 | A1 | 9/2008 | Ahmed |
| 2009/0011730 | A1* | 1/2009 | Liang et al. ................ 455/127.2 |
| 2009/0034642 | A1* | 2/2009 | Rofougaran et al. ......... 375/261 |
| 2009/0034653 | A1 | 2/2009 | Rofougaran |

OTHER PUBLICATIONS

Non-Final Office Action mailed Jun. 21, 2010, U.S. Appl. No. 11/875,037, filed Oct. 22, 2007, Ahmadreza Rofougaran.

Final Office Action mailed Oct. 27, 2010, U.S. Appl. No. 11/875,037, filed Oct. 22, 2007, Ahmadreza Rofougaran.

* cited by examiner

US 8,155,604 B2

METHOD AND SYSTEM FOR POWER SUPPLY ADJUSTMENT AND POLAR MODULATION IN AN RF TRANSMITTER

CROSS-REFERENCE TO RELATED APPLICATIONS/INCORPORATION BY REFERENCE

This patent application makes reference to, claims priority to and claims benefit from U.S. Provisional Patent Application Ser. No. 60/953,095 filed on Jul. 31, 2007.

The above stated application is hereby incorporated herein by reference in its entirety.

FIELD OF THE INVENTION

Certain embodiments of the invention relate to signal processing. More specifically, certain embodiments of the invention relate to a method and system for power supply adjustment and polar modulation in an RF transmitter.

BACKGROUND OF THE INVENTION

Mobile communications have changed the way people communicate and mobile phones have been transformed from a luxury item to an essential part of every day life. The use of mobile phones is today dictated by social situations, rather than hampered by location or technology. While voice connections fulfill the basic need to communicate, and mobile voice connections continue to filter even further into the fabric of every day life, the mobile Internet is the next step in the mobile communication revolution. The mobile Internet is poised to become a common source of everyday information, and easy, versatile mobile access to this data will be taken for granted.

As the number of electronic devices enabled for wireline and/or mobile communications continues to increase, significant efforts exist with regard to making such devices more power efficient. For example, a large percentage of communications devices are mobile wireless devices and thus often operate on battery power. Additionally, transmit and/or receive circuitry within such mobile wireless devices often account for a significant portion of the power consumed within these devices. Moreover, in some conventional communication systems, transmitters and/or receivers are often power inefficient in comparison to other blocks of the portable communication devices. Accordingly, these transmitters and/or receivers have a significant impact on battery life for these mobile wireless devices.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided power supply adjustment and polar modulation in an RF transmitter, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for power supply adjustment and polar modulation in an RF transmitter. In an RF transmitter, a signal representative of an amplitude of a pair of phase-quadrature baseband signals may be generated, and a voltage and/or current supplied to one or more components of said RF transmitter may be controlled based on said generated signal. Additionally, aspects of the invention may enable dividing each signal of said pair of baseband signals by said generated signal, up-converting the divided signals, and combining the up-converted signals to generate a phase modulated RF signal. The phase modulated signal may be amplitude modulated by controlling, based on the generated signal, the gain of a power amplifier in the RF transmitter. The divided signals may be up-converted by mixing an in-phase signal of said pair of baseband signals with a first local oscillator signal and mixing a quadrature-phase signal of said pair of baseband signals with a second local oscillator signal, wherein said first local oscillator signal and said second local oscillator signal are in phase-quadrature. The one or more components may comprise, for example, one or more amplifiers, and/or one or more mixers. The generated signal may result from squaring each signal of the pair of baseband signals and calculating a square root of a sum of the squared signals.

Figure 1:
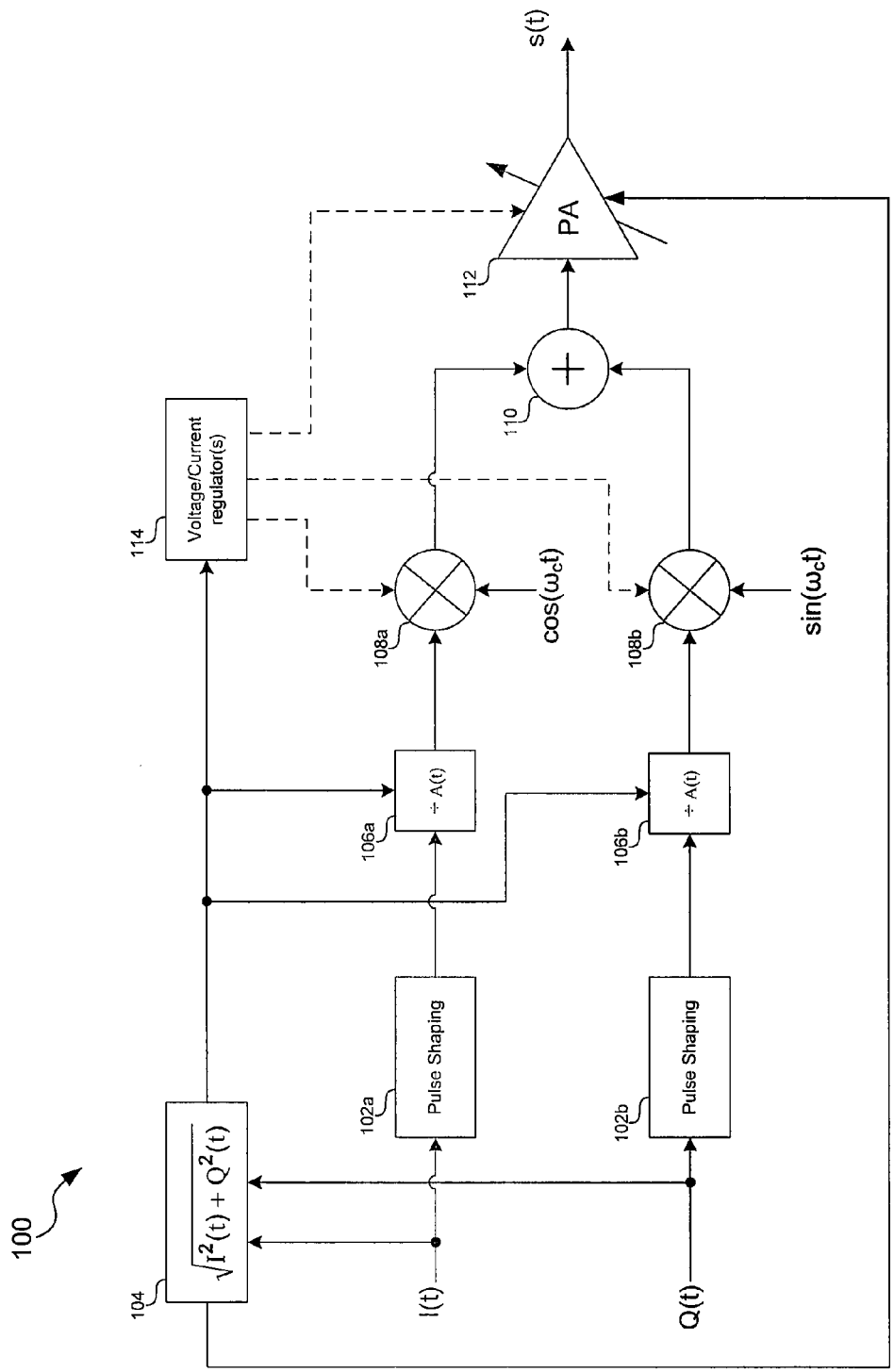
FIG. 1 is a block diagram illustrating an exemplary architecture for polar modulation and control of a power supply based on a signal amplitude, in accordance with an embodiment of the invention.

FIG. 1 is a block diagram illustrating an exemplary architecture for controlling a power supply and polar modulating a signal, in accordance with an embodiment of the invention. Referring to FIG. 1 there is shown at least a portion of an RF transmitter 100 comprising two pulse shaping circuits 106a and 106b, amplitude calculation block 104, division blocks 106a and 106b, mixers 108a and 108b, a summing circuit 110, and power amplifier (PA) 112.

The pulse shaping circuits 106a and 106b may comprise suitable logic, circuitry, and/or code that may enable filtering, equalizing, compressing, or otherwise processing and/or conditioning the signals I(t) and Q(t), respectively.

The amplitude calculation block 104 may comprise suitable logic, circuitry, and/or code that may enable performing the following calculation:

$$A(t) = \sqrt{I^2(t) + Q^2(t)} \qquad \text{EQ. 1}$$

where I(t) and Q(t) are in-phase and quadrature-phase, respectively, components of an input baseband signal and A(t) represents an amplitude component of a polar modulated signal. In various embodiments of the invention, the calculation may be carried out in the analog domain, the digital domain, or a combination thereof. In various embodiments of the invention, the amplitude calculation block 104 may comprise one or more processors or may be implemented in one or more processors.

The division blocks 106a and 106b may comprise suitable logic, circuitry, and/or code that may enable dividing one baseband signal by another. In various embodiments of the invention, the calculation may be carried out in the analog domain, the digital domain, or a combination thereof. In various embodiments of the invention, the amplitude calculation block 104 may comprise one or more processors or may be implemented in one or more processors.

The mixers 108a and 108b may comprise suitable logic, circuitry, and/or code that may enable generation of inter-modulation products resulting from the mixing of a baseband signal and a RF carrier from, for example, a local oscillator. The mixer 108a may, for example, be enabled to utilize an in-phase carrier signal to generate in-phase inter-modulation products. The mixer 108b may, for example, be enabled to utilize a quadrature phase LO signal to generate quadrature phase inter-modulation products. The frequency of the carrier signals may be determined based on the desired radio frequency for transmission. In this regard, the mixers 108a and 108b may enable up-converting, for example, baseband signals of a fixed frequency to a variable radio frequency for transmission. In various embodiments of the invention, a voltage/current regulator 114 supplying the mixers 108a and/or 108b may be modified based on the amplitude signal. In this manner, linearity requirements and/or efficiency of the system may be improved.

The summing circuit 110 may comprise suitable logic, circuitry, and/or code that may enable adding an in-phase component and a quadrature-phase component to generate a phase modulated RF signal. In various embodiments of the invention, the calculation may be carried out in the analog domain, the digital domain, or a combination thereof. In various embodiments of the invention, the summing circuit 110 may comprise one or more processors or may be implemented in one or more processors.

The power amplifier (PA) 420 may comprise suitable logic, circuitry, and/or code that may enable buffering and/or amplification of a RF signal and outputting the signal to an antenna for transmission. In this regard, the gain of the PA 112 may be adjustable and may enable transmitting signals of varying strength. Accordingly, the PA 112 may enable amplitude modulating an RF signal input to the PA 112. In this regard, a bias point or other adjustable parameter of the PA 112 may be controlled to vary the gain of the PA 112 resulting in amplitude modulation of the PA 112 output. Additionally, a voltage/current regulator 114 supplying the PA 112 may be modified based on the amplitude signal. In this manner, linearity requirements and/or efficiency of the system may be improved as described, for example, with respect to FIG. 3.

The voltage/current regulator 114 may comprise suitable logic circuitry, and/or code that may be a power source to one or more of the mixers 108a, 108b, and the PA 112. Additionally, the voltage/current regulator 114 may enable altering a voltage and/or current it supplies based on an input signal. In this regard, the voltage/current regulator 114 may adjust a voltage and/or current supplied to the mixers 108a and 108b, and/or the PA 112, based on the amplitude signal from the amplitude calculation block 104. In one embodiment of the invention, the output voltage and/or current of the voltage/current regulator 114 may scale linearly with A(t).

In operation, a baseband signal may be split into in-phase, I(t), and quadrature-phase Q(t), components. The signal components may be conveyed to the pulse shaping circuits 102a and 102b, respectively. Additionally, I(t) and Q(t) may be conveyed to the amplitude calculation block 104 where A(t) may be generated. The output of the pulse shaping blocks 102a and 102b may, respectively, be conveyed to the division blocks 106a and 106b. The division blocks 106a and 106b may divide I(t) and Q(t) by A(t) to generate I'(t) and Q'(t). I'(t) and Q'(t) may, respectively, be mixed with in-phase and quadrature-phase components of an RF carrier signal. The outputs of the mixers may then be summed to generate a carrier signal phase modulated by the baseband signal. The phase modulated signal may be conveyed to the PA 112. The gain of the PA 112 may be controlled to amplitude modulate the signal output by the PA 112. Accordingly, the signals transmitted by the PA 112 may comprise a RF carrier polar modulated by the baseband signal. Additionally, the voltage/current regulator 114 may scale the voltage and/or current supplied to the mixers 108a, 108b, and/or the PA 112 based on the signal received from the amplitude calculation block 104. For example, when the signal from the amplitude calculation block is relatively small, a voltage and/or current supplied by the voltage/current regulator 114 may be reduced. Similarly, when the signal from the amplitude calculation block is relatively large, a voltage and/or current supplied by the voltage/current regulator 114 may be increased.

Figure 2A:
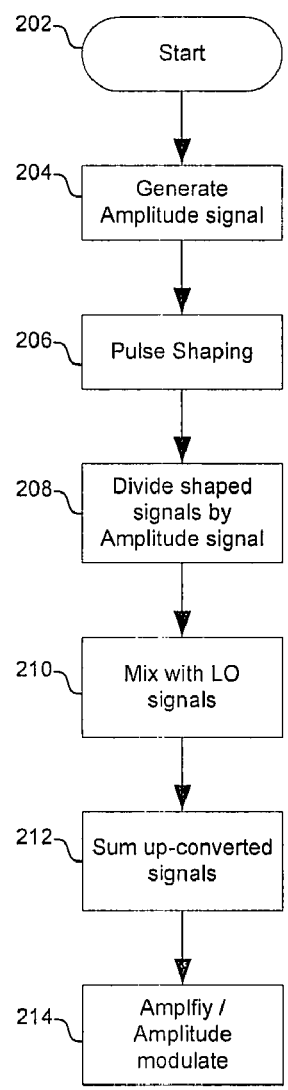
FIG. 2a is a flow chart illustrating exemplary steps for controlling a power supply to a PA for amplitude modulating an output of the PA, in accordance with an embodiment of the invention

FIG. 2a is a flow chart illustrating exemplary steps for controlling a gain of a PA for amplitude modulating an output of the PA, in accordance with an embodiment of the invention. Referring to FIG. 2a, the exemplary steps may begin with start step 202. Subsequent to step 202, the exemplary steps may advance to step 204. In step 204, a signal representative of the amplitude of a pair of phase quadrature baseband signals I and Q may be generated. In this regard, EQ. 1 above may be utilized to generate the amplitude signal. Subsequent to step 204, the exemplary steps may advance to step 206.

In step 206, the signals I and Q may be processed by a pulse shaping block. For example, each of the signals I and Q may be filtered, equalized, and/or compressed. Subsequent to step 206, the exemplary steps may advance to step 208. In step 208, the signals I and Q may each be divided by the amplitude signal generated in step 204, resulting in signals, I' and Q'. Subsequent to step 208, the exemplary steps may advance to step 210. In step 210, the signals I' and Q' may be mixed with in-phase and quadrature-phase LO signals, respectively, to up-convert the signals to RF. Subsequent to step 210, the exemplary steps may advance to step 212. In step 212, the up-converted signals may be combined to generate a phase modulated RF signal. Subsequent to step 212, the exemplary steps may advance to step 214. In step 214, the phase modulated signal resulting from step 212 may be amplified for transmission by a power amplifier. Moreover, the gain of the amplifier may be controlled, based on the amplitude signal generated in step 204, to amplitude modulate the output of the PA. In this manner, a polar modulated signal may be generated.

Figure 2B:
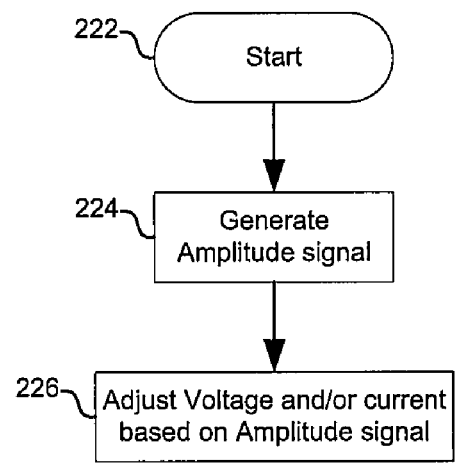
FIG. 2b is a flow chart illustrating exemplary steps for controlling a power supply to improve transmitter efficiency, in accordance with an embodiment of the invention

FIG. 2b is a flow chart illustrating exemplary steps for controlling a power supply to improve transmitter efficiency, in accordance with an embodiment of the invention. Referring to FIG. 2b, the exemplary steps may begin with start step 222. Subsequent to step 222, the exemplary steps may advance to step 224. In step 224, a signal representative of the amplitude of the signals I and Q may be generated. In this regard, EQ. 1 above may be utilized to generate the amplitude signal. Subsequent to step 224, the exemplary steps may advance to step 226. In step 226, a voltage and/or current supplying a power amplifier and/or mixers may be adjusted based on the amplitude signal generated in step 224. For example, a supply voltage to a PA may be increased when the amplitude is relatively low and the supply voltage to the PA may be increased when the amplitude is relatively high. In this manner, efficiency of the PA may be improved over conventional methods and systems as, for example, described with respect to FIG. 3.

Figure 3:
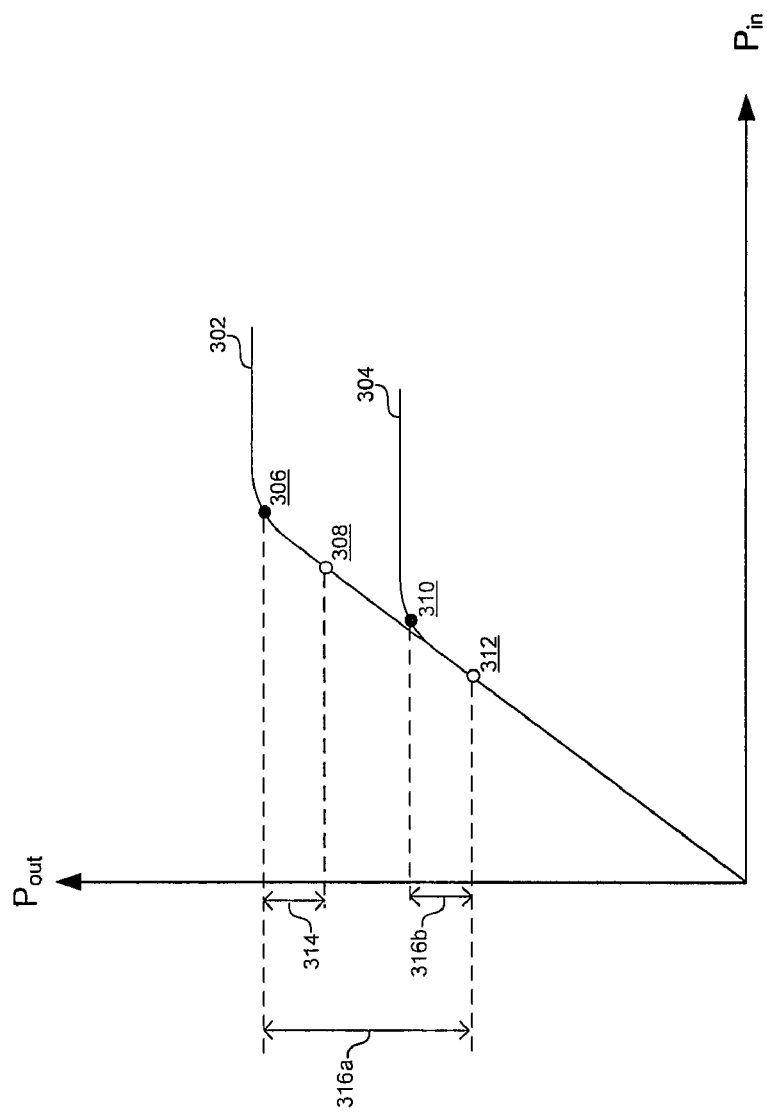
FIG. 3 is a diagram illustrating exemplary transfer characteristics of a PA for different supply voltages, in accordance with an embodiment of the invention.

FIG. 3 is a diagram illustrating exemplary transfer characteristics of a PA for different supply voltages, in accordance with an embodiment of the invention. Referring to FIG. 3 there is shown a PA transfer characteristic 302 and 1 dB compression point 306 corresponding to a higher supply voltage, a PA transfer characteristic 304 and 1 dB compression point 310 corresponding to a lower supply voltage, an operating point 308 corresponding to higher PA output levels, and an operating point 312 corresponding to lower PA output levels.

In operation, if a PA is always powered with a higher supply voltage, then the transfer characteristic of the PA may always be the characteristic 302. Accordingly, when the output levels of the PA are around point 312, the PA will be significantly less power efficient, than when output levels of the PA are around the point 308. In this regard, a determinant of PA efficiency may be the difference between the operating point and the 1 dB compression point. Accordingly, an operating point closer to the 1 db compression point may equate to improved power efficiency. For example, the difference 316*a* between points 306 and 312 may be significantly greater than the difference 314 between points 306 and 308. Accordingly, when operating around the point 312, reducing the supply voltage of the PA such that the 1 dB compression point is moved to the point 310, then the efficiency of the PA may be improved. In this regard, the distance 316*b* between the points 310 and 312 may be significantly less than the distance 316*a*.

Figure 4:
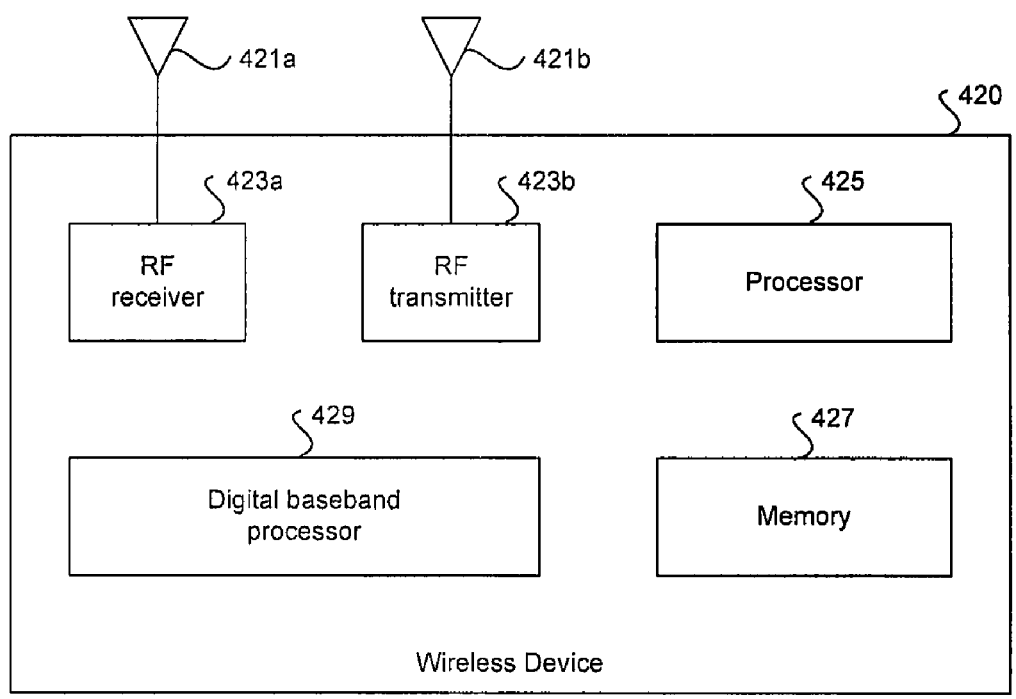
FIG. 4 is a block diagram illustrating an exemplary wireless device, in accordance with an embodiment of the invention.

FIG. 4 is a block diagram illustrating an exemplary wireless device, in accordance with an embodiment of the invention. Referring to FIG. 4, there is shown a wireless device 420 that may comprise an RF receiver 423*a*, an RF transmitter 423*b*, a digital baseband processor 429, a processor 425, and a memory 427. A receive antenna 421*a* may be communicatively coupled to the RF receiver 423*a*. A transmit antenna 421*b* may be communicatively coupled to the RF transmitter 423*b*. The wireless device 420 may be operated in a system, such as the cellular network and/or digital video broadcast network, for example.

The RF receiver 423*a* may comprise suitable logic, circuitry, and/or code that may enable processing of received RF signals. The RF receiver 423*a* may enable receiving RF signals in a plurality of frequency bands. For example, the RF receiver 423*a* may enable receiving signals in cellular frequency bands. Each frequency band supported by the RF receiver 423*a* may have a corresponding front-end circuit for handling low noise amplification and down conversion operations, for example. In this regard, the RF receiver 423*a* may be referred to as a multi-band receiver when it supports more than one frequency band. In another embodiment of the invention, the wireless device 420 may comprise more than one RF receiver 423*a*, wherein each of the RF receivers 423*a* may be a single-band or a multi-band receiver.

The RF receiver 423*a* may down convert the received RF signal to a baseband signal that comprises an in-phase (I) component and a quadrature (Q) component. The RF receiver 423*a* may perform direct down conversion of the received RF signal to a baseband signal, for example. In some instances, the RF receiver 423*a* may enable analog-to-digital conversion of the baseband signal components before transferring the components to the digital baseband processor 429. In other instances, the RF receiver 423*a* may transfer the baseband signal components in analog form.

The digital baseband processor 429 may comprise suitable logic, circuitry, and/or code that may enable processing and/or handling of baseband signals. In this regard, the digital baseband processor 429 may process or handle signals received from the RF receiver 423*a* and/or signals to be transferred to the RF transmitter 423*b*, when the RF transmitter 423*b* is present, for transmission to the network. The digital baseband processor 429 may also provide control and/or feedback information to the RF receiver 423*a* and to the RF transmitter 423*b* based on information from the processed signals. In this regard, the baseband processor may provide a control signal to one or more of the pulse shaping blocks 102*a* and 102*b*, the amplitude calculation block 104, the division blocks 106*a* and 106*b*, the mixers 108*a* and 108*b*, voltage/current regulator 114, the summer 110, and/or the PA 112. The digital baseband processor 429 may communicate information and/or data from the processed signals to the processor 425 and/or to the memory 427. Moreover, the digital baseband processor 429 may receive information from the processor 425 and/or to the memory 427, which may be processed and transferred to the RF transmitter 423*b* for transmission to the network.

The RF transmitter 423*b* may comprise suitable logic, circuitry, and/or code that may enable processing of RF signals for transmission. In this regard, the RF transmitter 423*b* may comprise logic, circuitry, and/or code similar to or the same as the RF transmitter 100 described in FIG. 1. The RF transmitter 423*b* may enable transmission of RF signals in a plurality of frequency bands. For example, the RF transmitter 423*b* may enable transmitting signals in cellular frequency bands. Each frequency band supported by the RF transmitter 423*b* may have a corresponding front-end circuit for handling amplification and up conversion operations, for example. In this regard, the RF transmitter 423*b* may be referred to as a multi-band transmitter when it supports more than one frequency band. In another embodiment of the invention, the wireless device 420 may comprise more than one RF transmitter 423*b*, wherein each of the RF transmitter 423*b* may be a single-band or a multi-band transmitter.

The RF transmitter 423*b* may quadrature up convert the baseband signal comprising I/Q components to an RF signal. The RF transmitter 423*b* may perform direct up conversion of the baseband signal to a RF signal, for example. The RF transmitter may be enabled to polar modulate one or more carrier signals by the baseband signal. In this regard, the RF transmitter may be enabled to separate the generation of phase and amplitude components of a signal to be transmitted and may be enabled to perform phase modulation independent of amplitude modulation, as described with respect to FIG. 1. In some instances, the RF transmitter 423*b* may enable digital-to-analog conversion of the baseband signal components received from the digital baseband processor 429 before up conversion. In other instances, the RF transmitter 423*b* may receive baseband signal components in analog form.

The processor 425 may comprise suitable logic, circuitry, and/or code that may enable control and/or data processing operations for the wireless device 420. The processor 425 may be utilized to control at least a portion of the RF receiver 423*a*, the RF transmitter 423*b*, the digital baseband processor 429, and/or the memory 427. In this regard, the processor 425 may generate at least one signal for controlling operations within the wireless device 420. In this regard, the baseband processor may provide a control signal to one or more of the pulse shaping blocks 102a and 102b, the amplitude calculation block 104, the division blocks 106a and 106b, the mixers 108a and 108b, voltage/current regulator 114, the summer 110, and/or the PA 112. The processor 425 may also enable executing of applications that may be utilized by the wireless device 420. For example, the processor 425 may execute applications that may enable displaying and/or interacting with content received via cellular transmission signals in the wireless device 420.

The memory 427 may comprise suitable logic, circuitry, and/or code that may enable storage of data and/or other information utilized by the wireless device 420. For example, the memory 427 may be utilized for storing processed data generated by the digital baseband processor 429 and/or the processor 425. The memory 427 may also be utilized to store information, such as configuration information, that may be utilized to control the operation of at least one block in the wireless device 420. For example, the memory 427 may comprise information necessary to configure the RF receiver 423a to enable receiving cellular transmission in the appropriate frequency band. In this regard, the baseband processor may store control and/or configuration information for one or more of the pulse shaping blocks 102a and 102b, the amplitude calculation block 104, the division blocks 106a and 106b, the mixers 108a and 108b, voltage/current regulator 114, the summer 110, and/or the PA 112.

Aspects of a method and system for power supply adjustment for polar modulation of an RF signal are provided. In an RF transmitter 100, a signal representative of an amplitude of a pair of phase-quadrature baseband signals, I(t), and Q(t), may be generated, and a voltage and/or current supplied to one or more components of said RF transmitter 100 may be controlled based on said generated signal. Additionally, aspects of the invention may enable dividing each signal of said pair of baseband signals by said generated signal, up-converting the divided signals, and combining the up-converted signals to generate a phase modulated RF signal. The phase modulated signal may be amplitude modulated by controlling, based on the generated signal, the gain of a power amplifier 112 in the RF transmitter 100. The divided signals may be up-converted by mixing an in-phase signal of said pair of baseband signals with a first local oscillator signal and mixing a quadrature-phase signal of said pair of baseband signals with a second local oscillator signal, wherein said first local oscillator signal and said second local oscillator signal are in phase-quadrature. The one or more components may comprise, for example, one or more amplifiers 112, and/or one or more mixers 108. The generated signal may result from squaring each signal of the pair of baseband signals and calculating a square root of a sum of the squared signals.

Another embodiment of the invention may provide a machine-readable storage, having stored thereon, a computer program having at least one code section executable by a machine, thereby causing the machine to perform the steps as described herein for power supply adjustment and polar modulation in an RF transmitter.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for signal processing, the method comprising: in an RF transmitter:
generating a signal representative of an amplitude of a pair of phase-quadrature baseband signals;
controlling a supply voltage and/or supply current generated by a power supply of said RF transmitter and utilized to power at least one mixer and at least one power amplifier of said RF transmitter based on said generated signal representative of an amplitude of said phase-quadrature baseband signals; and
generating an up-converted signal using said phase-quadrature baseband signals and said signal representative of said amplitude of said phase-quadrature baseband signals.

2. The method according to claim 1, comprising dividing each signal of said pair of baseband signals by said generated signal, up-converting the divided signals, and combining the up-converted signals to generate a phase modulated RF signal.

3. The method according to claim 2, comprising amplitude modulating said phase modulated RF signal by controlling, based on said generated signal, the gain of a power amplifier of said RF transmitter.

4. The method according to claim 2, comprising up-converting said divided signals by mixing an in-phase signal of said pair of baseband signals with a first local oscillator signal and mixing a quadrature-phase signal of said pair of baseband signals with a second local oscillator signal, wherein said first local oscillator signal and said second local oscillator signal are in phase-quadrature.

5. The method according to claim 1, comprising controlling, utilizing said generated signal, a supply voltage and/or supply current generated by a power supply of said RF transmitter and utilized to power a pair of quadrature mixers of said RF transmitter.

6. The method according to claim 1, comprising squaring each signal of said pair of baseband signals and calculating a square root of a sum of said squared signals to generate said signal that is representative of an amplitude of said pair of baseband signals.

7. A machine-readable storage having stored thereon, a computer program having at least one code section for signal processing, the at least one code section being executable by a machine for causing the machine to perform steps comprising:

in an RF transmitter:
generating a signal representative of an amplitude of a pair of phase-quadrature baseband signals;
controlling a supply voltage and/or supply current generated by a power supply of said RF transmitter and utilized to power at least one mixer and at least one power amplifier of said RF transmitter based on said generated signal representative of an amplitude of said phase-quadrature baseband signals; and
generating an up-converted signal using said phase-quadrature baseband signals and said signal representative of said amplitude of said phase-quadrature baseband signals.

8. The machine-readable storage according to claim 7, wherein said at least one code section comprises code for dividing each signal of said pair of baseband signals by said generated signal, up-converting the divided signals, and combining the up-converted signals to generate a phase modulated RF signal.

9. The machine-readable storage according to claim 8, wherein said at least one code section comprises code for amplitude modulating said phase modulated RF signal by controlling, based on said generated signal, the gain of a power amplifier of said RF transmitter.

10. The machine-readable storage according to claim 8, wherein said at least one code section comprises code for up-converting said divided signals by mixing an in-phase signal of said pair of baseband signals with a first local oscillator signal and mixing a quadrature-phase signal of said pair of baseband signals with a second local oscillator signal, wherein said first local oscillator signal and said second local oscillator signal are in phase-quadrature.

11. The machine-readable storage according to claim 7, wherein said at least one code section comprises code for controlling, utilizing said generated signal, a supply voltage and/or supply current generated by a power supply of said RF transmitter and utilized to power a pair of quadrature mixers of said RF transmitter.

12. The machine-readable storage according to claim 7, wherein said at least one code section comprises code for squaring each signal of said pair of baseband signals and calculating a square root of a sum of said squared signals to generate said signal that is representative of an amplitude of said pair of baseband signals.

13. A system for signal processing, the system comprising:
one or more circuits in an RF transmitter that, at least enable:
generating a signal representative of an amplitude of a pair of phase-quadrature baseband signals;
controlling a supply voltage and/or supply current generated by a power supply of said RF transmitter and utilized to power at least one mixer and at least one power amplifier of said RF transmitter based on said generated signal representative of an amplitude of said phase-quadrature baseband signals; and
generating an up-converted signal using said phase-quadrature baseband signals and said signal representative of said amplitude of said phase-quadrature baseband signals.

14. The system according to claim 13, wherein said one or more circuits enable dividing each signal of said pair of baseband signals by said generated signal, up-converting the divided signals, and combining the up-converted signals to generate a phase modulated RF signal.

15. The system according to claim 14, wherein said one or more circuits enable amplitude modulating said phase modulated RF signal by controlling, based on said generated signal, the gain of a power amplifier of said RF transmitter.

16. The system according to claim 14, wherein said one or more circuits enable up-converting said divided signals by mixing an in-phase signal of said pair of baseband signals with a first local oscillator signal and mixing a quadrature-phase signal of said pair of baseband signals with a second local oscillator signal, wherein said first local oscillator signal and said second local oscillator signal are in phase-quadrature.

17. The system according to claim 13, wherein said one or more circuits enable controlling, utilizing said generated signal, a supply voltage and/or supply current generated by a power supply of said RF transmitter and utilized to power a pair of quadrature mixers of said RF transmitter.

18. The system according to claim 13, wherein said one or more circuits enable squaring each signal of said pair of baseband signals and calculating a square root of a sum of said squared signals to generate said signal that is representative of an amplitude of said pair of baseband signals.

* * * * *